Patented Oct. 17, 1922.

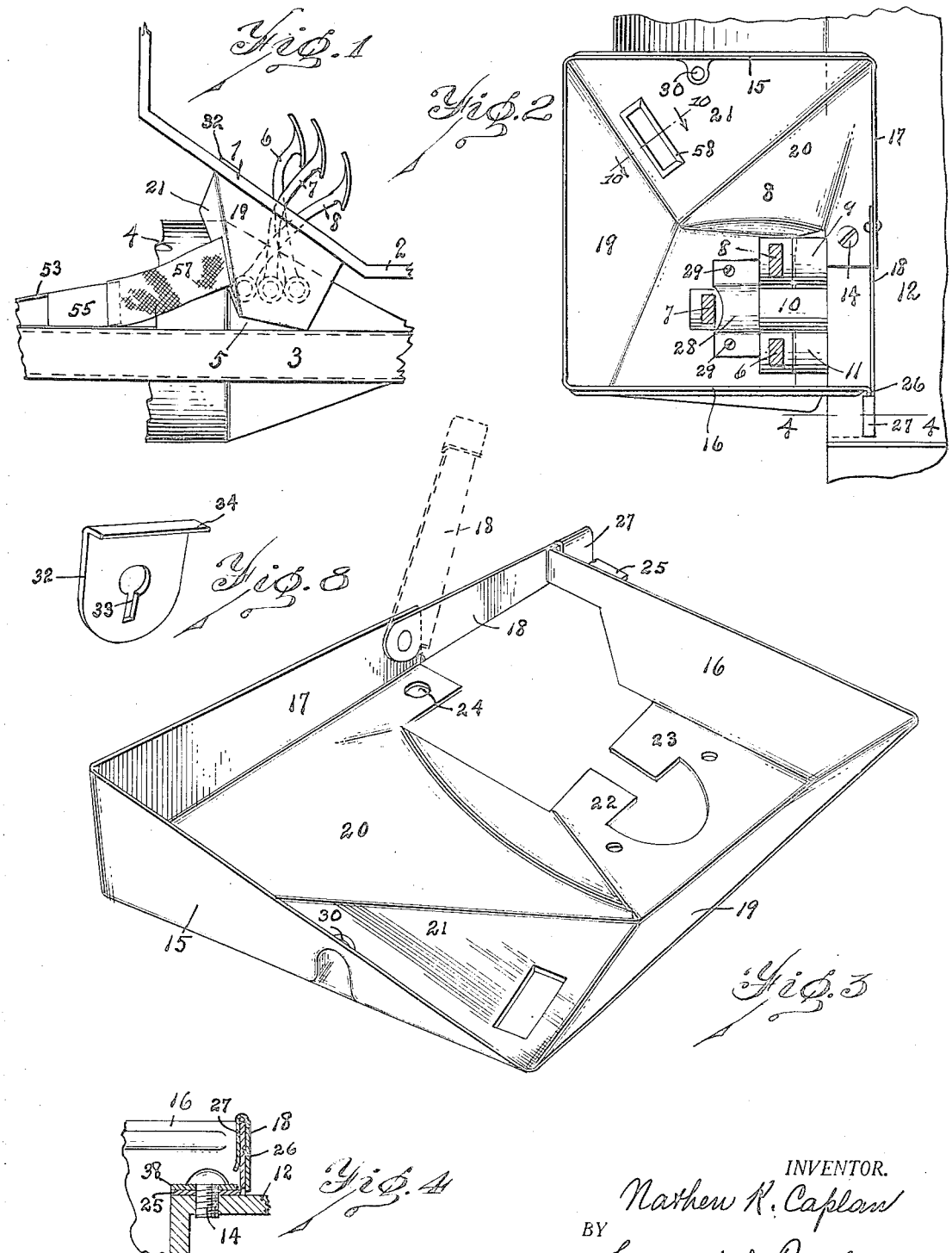

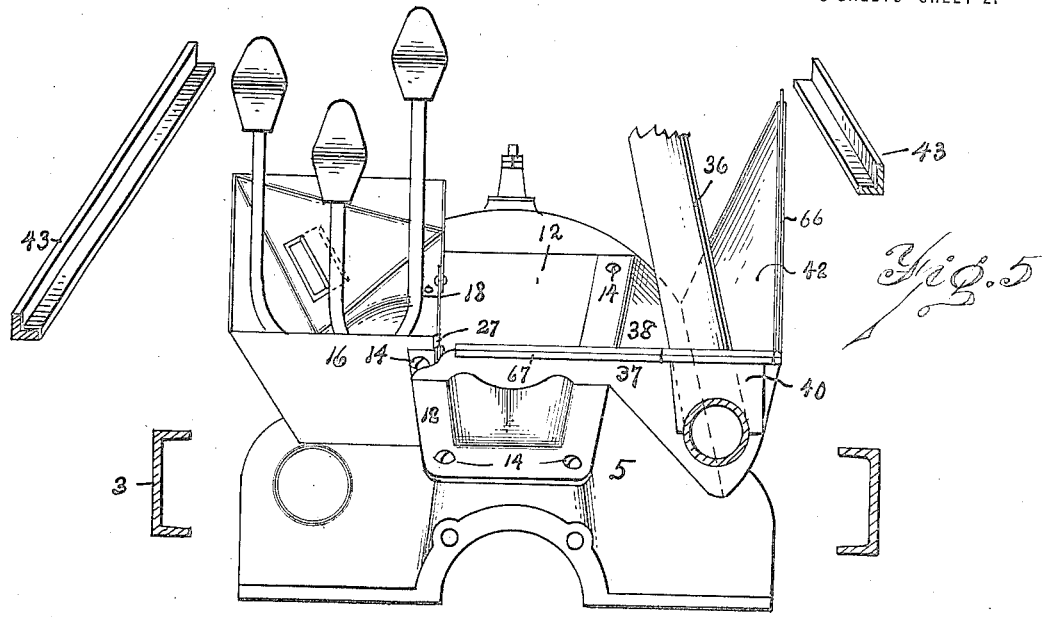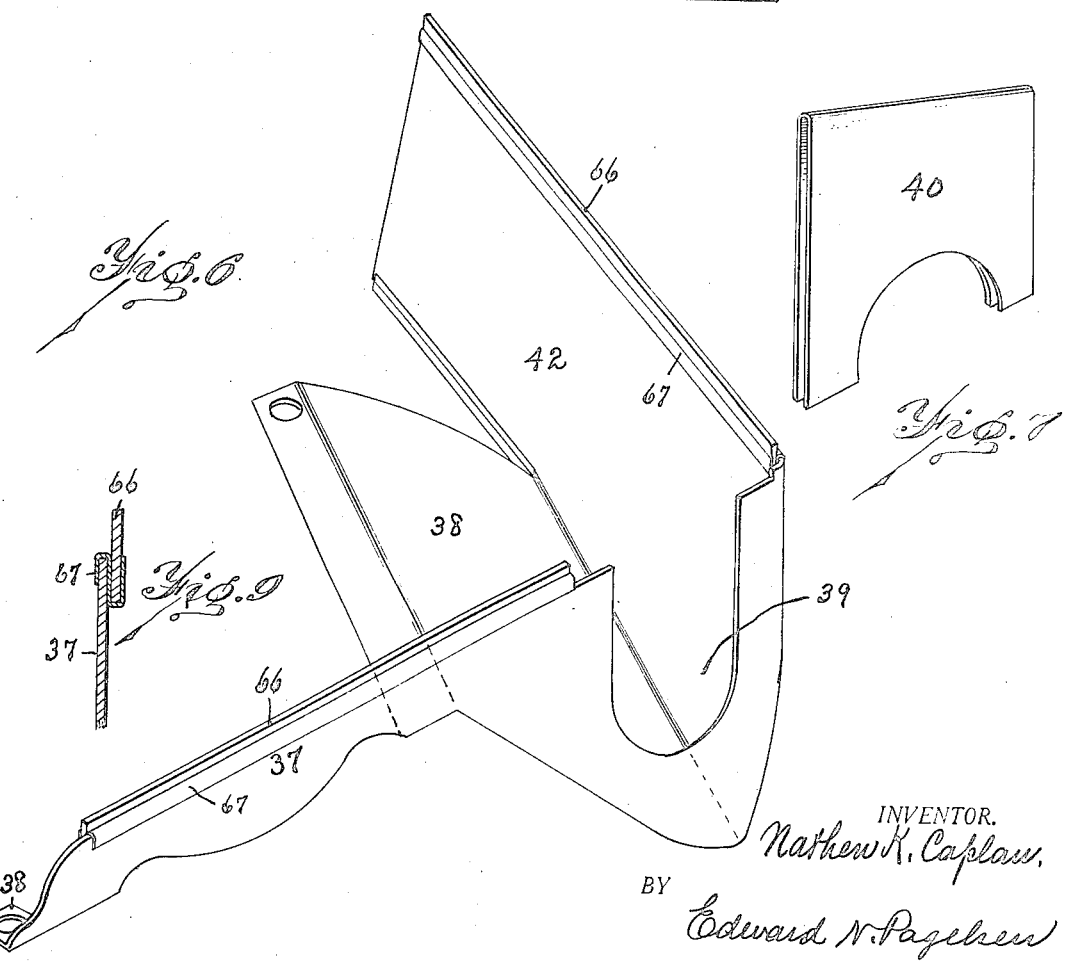

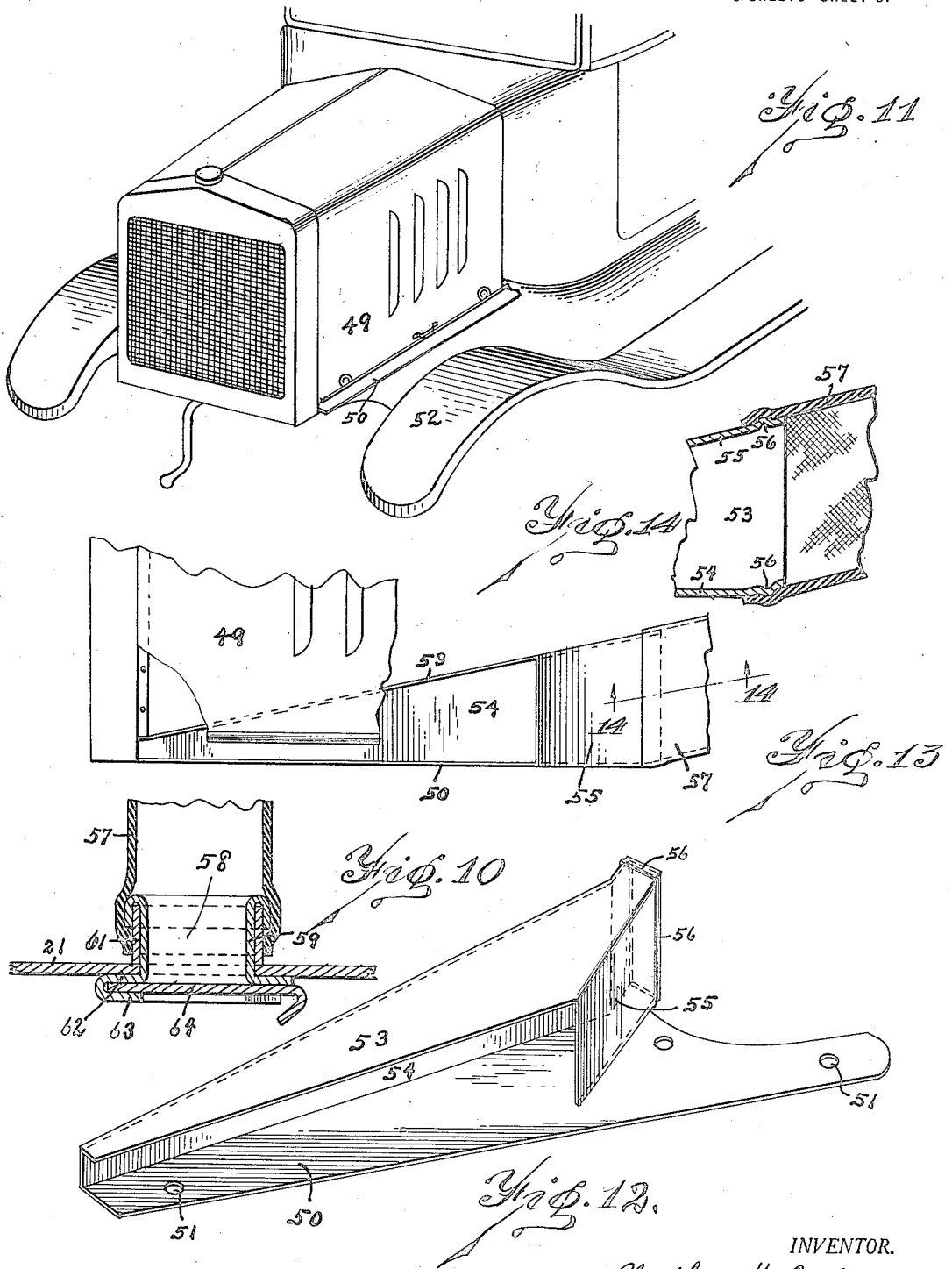

1,431,931

UNITED STATES PATENT OFFICE.

NATHEN K. CAPLAN, OF DETROIT, MICHIGAN.

DRAFT CONTROLLER.

Application filed July 1, 1921. Serial No. 481,742.

*To all whom it may concern:*

Be it known that I, NATHEN K. CAPLAN, a citizen of the United States, and residing at Detroit, in the county of Wayne and State of Michigan, have invented a new and Improved Draft Controller, of which the following is a specification.

This invention relates to means, especially adapted for Ford automobiles, for preventing or permitting blasts of air from coming up through the pedal slots in the floor boards around the pedals, and it comprises a shield adapted to be secured to the transmission casing around the pedal hubs and extending up to the floor boards, thus enclosing the space below the pedal slots, and in means for conducting air to the casing.

It further consists in forming this draft controller with a hinged portion which may be swung back to permit the entrance of a current of warm air from around the engine.

It also consists in a deflector extending around the exhaust pipe of the engine and connecting to the draft controller adjacent the hinged portion thereof for the purpose of directing a current of warm air from the exhaust pipe to the pedal slots.

It also consists of a conductor extending back from the front of the vehicle to conduct fresh air to said casing.

It also consists in the details of construction illustrated in the accompanying drawings and particularly pointed out in the claims.

In the drawings, Fig. 1 is a side elevation of the rear portion of the transmission of a Ford automobile and a draft controlling casing around the pedals. Fig. 2 is a plan of this casing. Fig. 3 is a perspective of this casing. Fig. 4 is a section on the line 4—4 of Fig. 2. Fig. 5 is a rear elevation of this draft controller mounted on a Ford engine. Fig. 6 is a perspective of the major portion of the deflector which is mounted adjacent the exhaust pipe. Fig. 7 is a small gate to fit around the exhaust pipe. Fig. 8 is a perspective of a securing device. Fig. 9 is a section of the upper edge of a casing member provided with a weather strip. Fig. 10 is a section of a connector to conduct air to the casing on the line 10—10 of Fig. 2. Fig. 11 is a perspective of the front of an automobile provided with an intake for clean air. Fig. 12 is a perspective of this intake. Fig. 13 is an elevation of the same mounted under an automobile hood. Fig. 14 is a section on the line 14—14 of Fig. 13.

Similar reference characters refer to like parts throughout the several views.

Fig. 1 shows the floor boards 1 and 2, the side frame 3, the flywheel casing 4 and the transmission casing 5 of the well known Ford automobile. The pedals 6, 7 and 8 extend through slots in the floor board 1 a slotted metal plate (not shown) being employed to guide the pedals. These pedals are connected to shafts mounted in the hubs 9, 10 and 11 extending from the transmission casing, which has a cover 12 secured in position by screws 14.

In order to prevent a blast of air through these pedal slots, I have provided the casing shown in perspective in Fig. 3, preferably of sheet metal, consisting of the front wall 15, rear wall 16, inner wall 17 having a hinged section 18, outer side 19 and bottom consisting of the parts 20, 21, 22 and 23. The part 20 has a hole 24 and the lip 25 on the rear wall 16 has a hole for the screws 14. The wall 16 is bent back at 26 and the lip 27 on the hinged member 18 is adapted to fit over this lip. The inner ends of the parts 22 and 23 lie under the pedal hubs and a strap 28 extends over the hub 10 and is secured to these ends by screws 29. The curved edge of the part 20 also presses against the transmission case.

The upper edges of the walls 15, 16 and 17 and of the side 19 engage the floor board 1 and a screw (not shown) may extend down through the slot for the pedal 7 into the threaded hole 30 in a lug on the front wall 15. A clip 32 having a key-hole slot 33 may be used to support the head of this screw, the lip 34 on this clip extending over the edge of the pedal plate.

This shield is again shown in Fig. 5, which also shows an exhaust pipe 36 extending along the transmission case 5. In order to guide hot air to the pedal slots during cold weather, I attach a transverse deflector plate 37 and a downwardly and forwardly extending plate 38 to the cover 12 by means of screws 14, the plate 37 having a lip 38 (see Fig. 4) extending forward from its inner end and formed with a hole to receive the same screw that secures the lip 25 on the rear end 16 in position.

The transverse deflector plate 37 has a notch 39 to receive the exhaust pipe and a clip 40 is adapted to fit over this pipe and the edges of the notch 39 as shown in Fig. 5. A plate 42 extends forward from the outer edge of the transverse plate 37 and connects with the plate 38, and at the same time, extends up to the floor, the frames 43 of which are indicated in Fig. 5. The heated air around the exhaust pipe is therefore prevented from passing out to the right and gathers against the transverse plate 37 by which it is deflected to the opening that is normally closed by the part 18 but which part is swung up and forward to lie along the side 17, the floor board being raised for this purpose. The heated air will then pass up through the pedal slots and warm the feet of the driver. The part 18, will, however, be in its normal position shown in Fig. 3 during warm weather.

In Figs. 11 to 14 inclusive means are shown for conducting clean fresh air from the front end of the vehicle, preferably from along the lower edge of the hood 49 adjacent the fender, to the casing around the pedals so that the space within the front of the automobile body may be properly ventilated. The intake nozzle is shown in Fig. 12 and consists of a bottom 50 formed with holes 51 to receive the bolts which attach the fender 52 to the chassis, a top 53, a back 54 and a front plate 55. The rear ends of these several plates may be formed into an outlet with the beads 56, indicated in Fig. 14, to retain the flexible tube 57, preferably of rubber, which connects to the thimble 58 attached to the front plate 21 of the pedal casing. This tube 57 may be of any other desired material.

While this thimble may be of any desired construction, I prefer to form it rectangular with an inner sleeve 59 extending through an opening in the plate 21, an outer sleeve 61 over which the outer edge of the inner sleeve is bent, an out-turned flange 62 on the inside of the plate 21 and an in-turned lip 63 which constitutes a guide for the gate 64 around three sides of the thimble. The flexible tube 57 is drawn over the outer end of the thimble, and, when the gate 64 is withdrawn, conducts clean fresh air to the pedal casing.

In order to produce a fit between the casing and the parts connected thereto and the floor boards 1 and 2 of the vehicle, I may attach a packing strip 66 of felt or other desirable material to these metal parts by means of an S-shaped strip 67 of sheet metal, this packing strip being attached wherever desired, although I have shown it only along the edges of the parts 37 and 42 in Fig. 6.

While the draft preventer and heater shown in the drawings is designed expressly for Ford automobiles, the present invention is not limited thereto, but can be embodied in devices of this character adapted for use in many different types of vehicles, which have pedal slots in the floor boards through which blasts of air are forced by the motion of the vehicles to the annoyance of the driver.

The mechanism illustrated in Figs. 11 to 14 inclusive may be installed on vehicles which are not equipped with the casing shown in Figs. 1 to 4, the thimble 58 shown in Fig. 10 being connected directly to the floor boards in any desired manner. It will be understood that while only one of these air intakes is shown, a second may be installed on the other side of the hood and be connected to the floor at an opening therein instead of to a casing. The side of the hood in each case bears against the outer edge of the top 53 and the distance between the lower edge of the hood and the bottom 50 determines the intake of air. If desired, a packing strip such as shown in Fig. 9 may be attached to the edge of the top 53 and of the plate 55 to prevent air passing to the engine.

These changes may all be made by those skilled in the art without departing from the spirit of my invention as set forth in the following claims.

I claim :—

1. In a draft controller and heater for automobiles, the combination of a casing below the floor boards and enclosing the pedal slots and pedals, a second casing extending around the exhaust pipe, and a transverse plate extending from one casing to the other at their rear ends and engaging the floor board of the engine.

2. In a draft controller and heater for automobiles, the combination of a casing below the floor boards and enclosing the pedal slots and pedals, a second casing extending around the exhaust pipe, a transverse plate extending from one casing to the other at their rear ends and engaging the floor board of the engine, and means for closing the passage between the casings.

3. In a draft preventer for automobiles, the combination of a sheet metal casing extending down from engagement with the bottom of the floor boards to the hubs of the control pedals and enclosing the pedals and having its upper end in contact with the floor board around the pedal slots.

4. In a draft controller for automobiles, the combination of a sheet metal casing extending down from engagement with the bottom of the floor boards to the hubs of the control pedals and enclosing the pedals and having its upper end in contact with the floor board around the pedal slots, one of the sides of the casing having a movable portion adapted to be displaced to admit heated air.

5. In a draft controller for automobiles, the combination of a sheet metal casing extending down from engagement with the bottom of the floor boards to the hubs of the control pedals and enclosing the pedals and having its upper end in contact with the floor board around the pedal slots, one of the sides of the casing having a movable portion adapted to be displaced to admit heated air, and a deflector mounted adjacent the casing and extending around the exhaust pipe of the vehicle engine to cause heated air to pass into said casing.

6. In a draft controller for automobiles, the combination of a sheet metal casing extending down from engagement with the bottom of the floor boards to the hubs of the control pedals and enclosing the pedals and having its upper end in contact with the floor board around the pedal slots, a conductor for clean air extending rearward from the front part of the automobile to said casing, and a gate to control the passage of air into said casing.

7. In a draft controller for automobiles, the combination of a sheet metal casing extending down from engagement with the bottom of the floor boards to the hubs of the control pedals and enclosing the pedals and having its upper end in contact with the floor board around the pedal slots, an air conductor of flexible material extending forward from the front part of the casing, a gate at the casing, and a metal nozzle at the front end of the flexible conductor.

8. In a draft controller for automobiles, the combination of a sheet metal casing extending down from engagement with the bottom of the floor boards to the hubs of the control pedals and enclosing the pedals and having its upper end in contact with the floor board around the pedal slots, a thimble mounted in the front part of the casing, a gate slidable in said thimble, a flexible air conductor connected to the thimble, and a tapering nozzle connected to the front end of said conductor and adapted to extend along the lower edge of the hood of the automobile.

9. In a draft controller and heater for automobiles, the combination of a casing below the floor boards and enclosing the pedal slots and pedals, a second casing extending around the exhaust pipe, a transverse plate extending from one casing to the other at their rear ends and engaging the floor board of the engine, and packing strips along the upper edges of a plurality of said parts to close the space between said edges and the floor boards.

NATHEN K. CAPLAN.